(12) United States Patent
Meadows et al.

(10) Patent No.: US 8,024,111 B1
(45) Date of Patent: Sep. 20, 2011

(54) TRAVEL ROUTE SYSTEM AND METHOD

(75) Inventors: Vernon Meadows, Lilburn, GA (US);
Joseph Paul Koval, Atlanta, GA (US)

(73) Assignee: Strategic Design Federation W, Inc. (VG)

( * ) Notice: Subject to any disclaimer, the term of this patent is extended or adjusted under 35 U.S.C. 154(b) by 719 days.

(21) Appl. No.: 12/061,172

(22) Filed: Apr. 2, 2008

(51) Int. Cl.
*G01C 21/00* (2006.01)
(52) U.S. Cl. ........ 701/201; 701/209; 701/212; 701/214; 340/905; 340/995.23
(58) Field of Classification Search .......... 701/201, 701/207, 208, 209, 211, 212, 214, 300; 340/905, 340/988, 994, 995.23
See application file for complete search history.

(56) References Cited

U.S. PATENT DOCUMENTS

| | | | |
|---|---|---|---|
| 5,982,298 A | 11/1999 | Lappenbusch et al. | |
| 5,999,882 A | 12/1999 | Simpson et al. | |
| 6,289,277 B1 | 9/2001 | Feyereisen et al. | |
| 6,317,686 B1 | 11/2001 | Ran | |
| 6,353,795 B1 | 3/2002 | Ranjan | |
| 6,615,133 B2 | 9/2003 | Bois et al. | |
| 7,181,346 B1 | 2/2007 | Kleist et al. | |
| 7,221,287 B2 | 5/2007 | Gueziec et al. | |
| 7,437,240 B2 | 10/2008 | Oumi et al. | |
| 7,493,214 B2 | 2/2009 | Jung et al. | |
| 2005/0021225 A1 | 1/2005 | Kantarjiev et al. | |
| 2007/0013551 A1* | 1/2007 | Gueziec | 340/905 |
| 2007/0038362 A1* | 2/2007 | Gueziec | 701/117 |
| 2008/0004794 A1 | 1/2008 | Hortvitz | |
| 2008/0270016 A1 | 10/2008 | Proietty et al. | |
| 2008/0270019 A1 | 10/2008 | Anderson et al. | |
| 2009/0005963 A1 | 1/2009 | Jarvinen | |
| 2009/0192702 A1 | 7/2009 | Bourne | |

* cited by examiner

*Primary Examiner* — Gertrude Arthur Jeanglaud
(74) *Attorney, Agent, or Firm* — Carlineo, Spicer & Kee, LLC

(57) ABSTRACT

A method of recommending a travel route includes receiving an indication of a start location and a destination location, and a desired arrival time at the destination location. One or more road segments included in possible routes are identified. Traffic data, event data, and weather data from at least one traffic data source, event data source, and weather data source, are received for the one or more road segments corresponding to a desired time of travel between the start location and destination location. At least one suggested travel route from the start location to the destination location for arriving at the destination by the desired arrival time is created based on analyzing the impact of the traffic data, the event data, and the weather data on the one or more road segments during the desired time of travel between the start location and destination location.

25 Claims, 11 Drawing Sheets

TRAVEL ROUTE SYSTEM AND METHOD

CROSS REFERENCE TO RELATED APPLICATIONS

This application is related to co-pending U.S. patent application Ser. No. 12/061,190, filed Apr. 2, 2008, entitled Travel Route System and Method, U.S. patent application Ser. No. 12/061,211, filed Apr. 2, 2008, entitled Travel Route System and Method, and U.S. patent application Ser. No. 12/061,230, filed Apr. 2, 2008, entitled Travel Route System and Method, the entire disclosures of which are incorporated herein by reference.

BRIEF DESCRIPTION OF THE DRAWINGS

The following detailed description will be better understood when read in conjunction with the appended drawings, in which there is shown one or more of the multiple embodiments of the present invention. It should be understood, however, that the various embodiments of the present invention are not limited to the precise arrangements and instrumentalities shown in the drawings.

In the Drawings.

DETAILED DESCRIPTION

Figure 1:
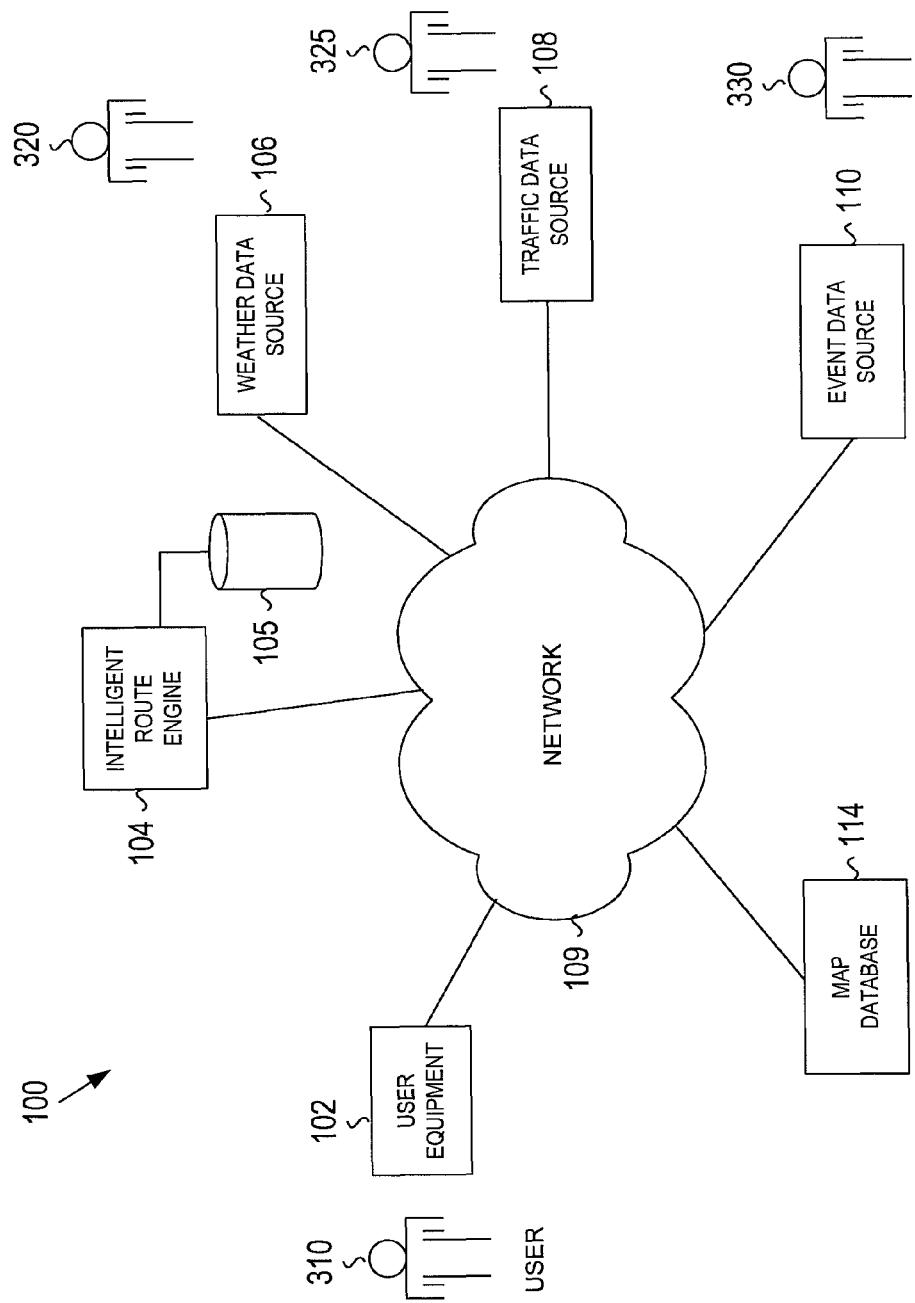
FIG. 1 is a system diagram of an exemplary travel routing system according to one embodiment.

Certain terminology is used herein for convenience only and is not to be taken as a limitation on the embodiments of the present invention. In the drawings, the same reference letters are employed for designating the same elements throughout the several figures.

Unified Modeling Language ("UML") can be used to model and/or describe methods and systems and provide the basis for better understanding their functionality and internal operation as well as describing interfaces with external components, systems and people using standardized notation. When used herein, UML diagrams including, but not limited to, use case diagrams, class diagrams and activity diagrams, are meant to serve as an aid in describing the embodiments of the present invention, but do not constrain implementation thereof to any particular hardware or software embodiments. Unless otherwise noted, the notation used with respect to the UML diagrams contained herein is consistent with the UML 2.0 specification or variants thereof and is understood by those skilled in the art.

For clarity, the multiple embodiments of the present invention are described with respect to an automobile and a wireless system. However, those skilled in the art will recognize that the suggested travel routing techniques described herein may be used with any mode of travel and any communication system generally known in the art, including air travel, fixed and mobile computing devices such as a PDA or personal computer, and wireless communication channels such as cellular telephone networks, WiFi and WiMax networks, wired telephone networks, and cable networks. A suggested travel route refers to a travel route provided between a start location and a destination location that satisfies requirements or preferences imposed by the user for travel between the start location and destination location, either through direct user interaction with the travel route system or those stored in a user profile in a database or memory associated with a component of the travel route system. A suggested travel route does not necessarily imply the route is the shortest or fastest route between the start location and the destination location, although in many cases, the suggested route determined in accordance with the travel route system is the shortest and/or fastest route.

Referring to FIG. 1, a travel route system 100 according to one embodiment is shown. The travel route system 100 includes user equipment (UE) 102 that may include any mobile or fixed communication device such as, but not limited to, Personal Digital Assistants (PDA), cell phones, personal computers, and in-vehicle navigation devices. The UE 102 receives inputs from a user 310 for interacting with the travel route system 100 via a network 109. The network 109 may be any network or system generally known in the art, including the Internet, LAN, or other computer-based communication or information sharing system. In some embodiments, the UE 102 may obtain one or more inputs automatically, either from components included in the UE 102, such as components with GPS and personal calendar functionality, or external sources, such as a website, servers, or personal devices associated with other individuals. The user 310 may input an origin, also referred to as the start location, a destination location and/or other text data via a key pad on a PDA, cell phone, or other portable device. The user input may include an address or landmark. A UE 102 that includes an internal position sensing device such as a Global Positioning System (GPS) may automatically determine the start location based on the current position or location of the user. The user 310 may also input a desired arrival time associated with the destination location, a desired departure time associated with the start location, as well as information related to a duration of time allowed for travel between the start location and the destination location. This information is transmitted by the UE 102 to the intelligent route engine 104.

The intelligent route engine 104 determines suggested routes between a start location and a destination location based on weather, traffic, and event data affecting possible routes between the start location and destination location. Preferences or requirements of the user 310 are also used in determining the suggested routes. The preferences and requirements may be input by the user into the UE 102 for a particular route request, or obtained from a user profile containing user preferences and other user related travel information, which may be stored on the UE 102, or in a database 105 associated with the intelligent route engine 104. The potential routes may be generated within the intelligent route engine either using map data stored in a external mapping database 104 or an internal database 105 for the intelligent route engine 104. It should be noted that point to point navigation routing algorithms are well understood in the art, and an omission of details in determining the possible routes between the staring location and destination location herein should not be considered limiting. Alternately, the possible routes may have been previously stored in the UE 102, mapping database 114, or intelligent route engine database 105. After the intelligent route engine 104 has applied the weather, traffic, event data to the possible routes, the output from the intelligent route engine 104, such as suggested routes between the start location and destination location or expected arrival or departure times, is displayed to the user through the UE 102. In one embodiment, the intelligent route engine 104 may display a primary suggested travel route and one or more secondary suggested travel routes, where the primary suggested route is the optimal suggested route between the start location and destination location most nearly satisfying the user preferences and requirements, with the secondary suggested routes also satisfying the user preferences and requirements. That is, the optimal suggested route between the same two locations may be different for different users depending on their preferences and requirements. For example, one user may always want the route having the shortest travel time between a start location and a destination location, such that the expected arrival time is before the desired arrival time, while another user prefers a route with dry roadway conditions, even if that route does not have the shortest travel time.

The travel route system 100 includes at least one data source that is generally any device, component or system that collects, gathers, observes, stores, predicts or aggregates data. The data sources may have their own systems and sensors for gathering the data, or alternately may aggregate data from one or more other sources. In FIG. 1, several data sources are shown, including a weather data source 106, a traffic data source 108, and an event data source 110. Each of the data sources 106, 108, 110 collects and/or provides data to the intelligent route engine 104. A data source may provide real-time or near real-time data, historical data, as well as forecasted or predictive data. The forecasted or predictive data may include both long term and short term forecast data. Long term forecast data is generally obtained using an analysis of past trends related to the data, and corresponds to time periods (e.g., days, weeks, months) in the future. Short term forecast data is generally obtained from an analysis of present conditions and projection of those conditions over a time where those projections can be made with a high confidence level, typically time periods of minutes to one or several days. Those skilled in the art will recognize that availability of real time data may range from several seconds to several minutes from the time the data is first known, depending on the data source and/or reporting or collection mechanism. The travel route system 100 of FIG. 1 should not be considered limiting with respect to the number of data sources of any one type (i.e., weather, traffic, or event) that can be accessed by the intelligent route engine 104. For example, more than one source of weather data, (e.g., the National Weather Service and weather.com) may be utilized at the same time by the intelligent route engine 104.

The weather data source 106 may provide short term and long term predictive weather conditions (i.e., forecasts) as well as current weather conditions, where the long term forecast may include a period of several weeks or months in the future, and the short term forecast includes the next few hour or days. The weather data source 106 may also contain a database of historical weather conditions that can be used by the intelligent route engine 104. The weather data source 106 may contain weather data on the occurrence or expected occurrence of all types of weather phenomenon, including but not limited to, thunderstorms, tornadoes, hurricanes, tropical storms, winter storms, hail, wind, rain, snow, sleet, freezing rain, and fog.

The traffic data source 108 includes a real-time traffic module that provides real-time or near-real-time traffic data and a traffic pattern module that provides both long term and short term traffic predictions using historical traffic pattern data. The real-time traffic module may provide traffic data related to the flow of traffic for a given road segment or travel route. The traffic pattern module provides long term and short term predictive traffic data related to historical traffic patterns along road segments or a travel route. Information concerning historical traffic patterns may be used to predict traffic flow along road segments or travel routes for a given day and time based on statistical data for a given day and time and may be used to predict traffic flow based on statistical data related to an event such as the events described. The traffic data source 108 may also include information related to traffic accidents, road closures or restrictions, roadway construction projects, drawbridge openings, and railroad gate closings, as well as anticipated or schedules occurrences of such roadway restrictions.

The event data source 110 provides real-time or near real-time data of currently occurring events, historical data concerning currently occurring or previously occurring events, as well as forecasted data concerning currently occurring events or potential future events (i.e., anticipated events that have not been officially scheduled). Examples of an event or event type include, but are not limited to, sports events, concerts, political rallies, emergency events, such as a building fires or floods, and community events, such as street festivals or parades. Information available about each event may include the venue for the event, a begin time for the event, an end time (either projected or actual), attendance (again, expected or actual), and roadway closures and restrictions associated with the event. In one embodiment, the event data source 110 provides a list of expected attendees (obtained using ticket purchase records, for example) and optionally, address information, such a street address or zip code, for the expected attendees of an event. Alternatively, the event data source 110 may provide aggregated address information, such as number of expected attendees grouped by neighborhood, street, city, state, or zip code.

It should be noted that there may be dependencies among and between the different data sources. For example, many events have an alternate date to account for inclement weather, and traffic data is often dependent upon such conditions as weather and proximate events. Thus, while the intelligent route engine 104 may utilize the network 109 to communicate with the data sources 106, 108, 110, the data sources 106, 108, 110 may also be in communication with each other in order to provide the most accurate and update information to the intelligent routing engine 104.

Figure 2:
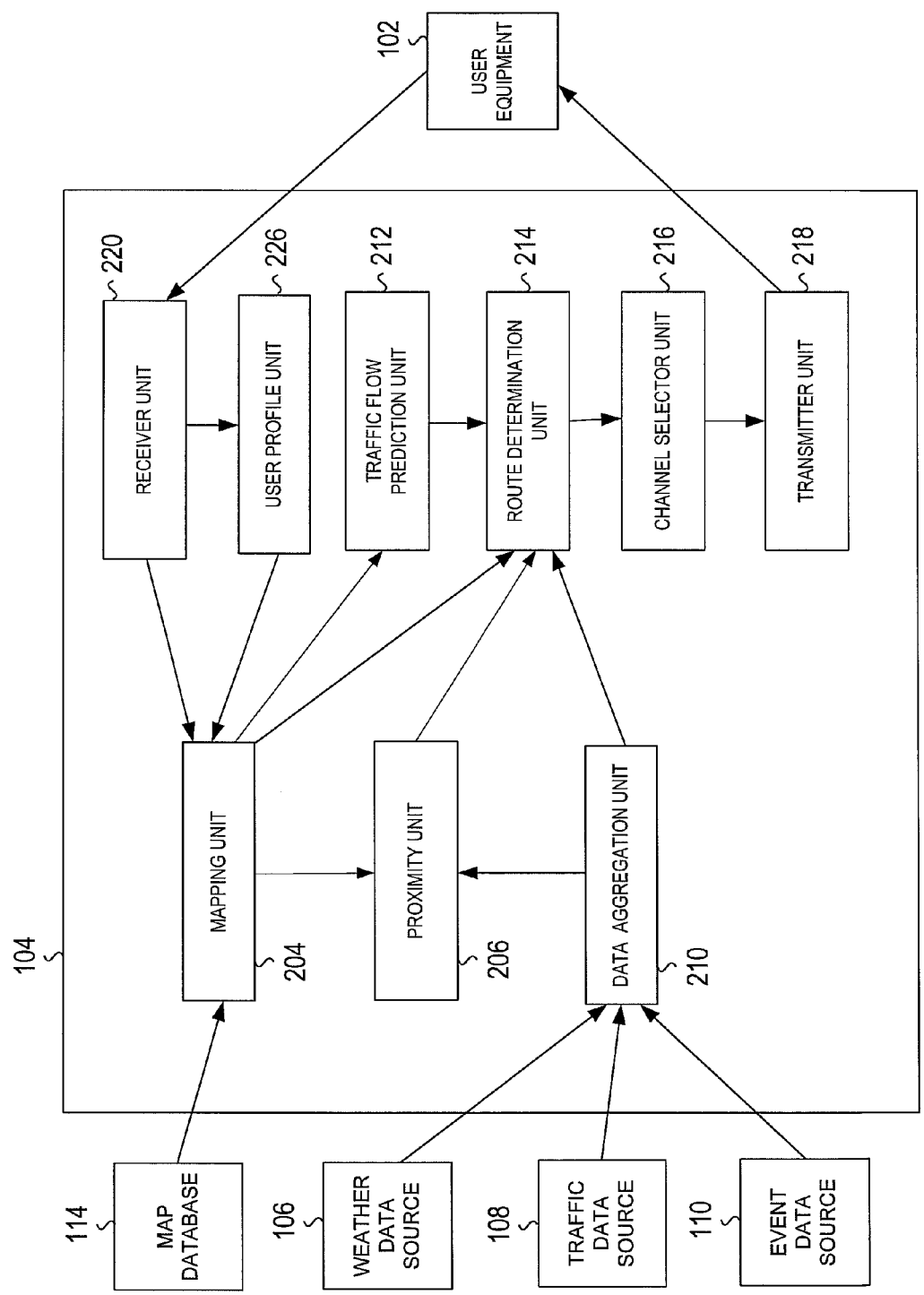
FIG. 2 is a block diagram of an intelligent route engine according to one embodiment of the travel route system of FIG. 1.
Figure 5:
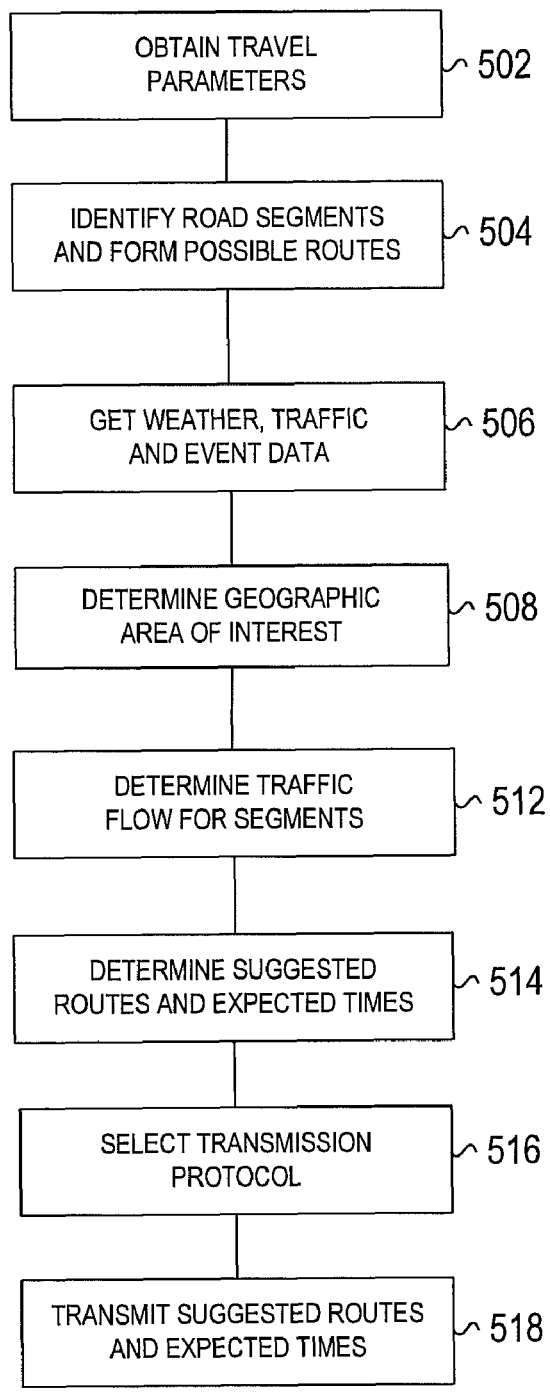
FIG. 5 is a flow diagram for determining a suggested travel route according to one embodiment of the travel route system of FIG. 1.

Referring to FIG. 2, the intelligent route engine 104 includes a receiver unit 220, a mapping unit 204, a proximity unit 206, a data aggregation unit 210, a traffic flow prediction unit 212, a route determination unit 214, a user profile unit 226, a channel selector unit 216, and a transmitter unit 218. Referring to generally to FIGS. 2 and 5, the receiver unit 220 receives travel parameters and other travel related information from the UE 102 via wired and/or wireless protocol well understood by those skilled in the art at step 502. The information may be directly entered into the UE 102 by a user or obtained from stored profile information on the UE 102.

These travel parameters includes, but are not limited to the start location and destination location, as well as a desired arrival time associated with the destination location, a desired departure time associated with start location, and a desired travel time duration from the start location to the destination location. The start location may be automatically received as Global Positioning System (GPS) coordinates if the UE 102 is a GPS capable device or they may be received as text or in another known format.

The mapping unit 204 receives the data representing the start location and destination location from the receiver unit 220 and identifies one or more road segments that can be linked in a number of combinations to create one or more possible travel routes between the start location and the destination location at step 504. Representing real roadway systems with road segments and creating routes between two locations using the road segments is well understood by those skilled in the art. The mapping unit 204 may support start location and destination location data input in the form of GPS coordinates. Alternately, the mapping unit 204 may support start location and destination location data input as text data, landmarks or other known formats and convert the data to a compatible format. The mapping unit 204 may interface with an internal database 105 of the intelligent route engine 104 that contains roadway data, including road segments and other map-related data, for a geographic region for example North America. This roadway data may be obtained by the intelligent route engine 104 from a variety of media, for example a physical media such as a Compact Disc (CD) or Digital Versatile Disc (DVD), or via a wired or wireless communication link. The roadway data in the internal database 105 may be updated as new and updated map information becomes available or when roadway data for a new region is required. Alternately, the mapping unit 204 may communicate with an external mapping database 114 via a wired or wireless communication link to obtain the roadway data, such as the road segments, used by the mapping unit 204 to determine the possible travel routes. In one embodiment, the mapping unit 204 may obtain some of the possible travel routes from another source, such as travel routes stored in the internal database 105, the user profile in the UE 102, or the mapping database 114.

At step 506, the data aggregation unit 210 receives weather, traffic, and event data from the weather, traffic, and event data sources 106, 108, 110, respectively, based on the desired start time and desired arrival time obtained from the UE 102, which is utilized by the proximity unit 206 to determine the geographic areas of interest.

The proximity unit 206 determines an extent for one or more geographic areas of interest for events, weather, or traffic that may affect the flow of traffic on one or more road segments that form the possible travel routes identified by the mapping unit 204 at step 508. There may be more than one geographic area of interest between the start location and destination location, depending on the number and extent of the traffic affecting occurrences in the received weather, traffic, and event data. These areas of interest may vary in size or shape depending on the types of weather phenomena, events, or traffic situations occurring or are expected to occur that may have an affect on the possible routes. For example, the proximity unit 206 may identify a relatively small geographic area of interest for a thunderstorm, and a large geographic area of interest for a severe winter storm. Similarly, if the expected attendance for an event at a venue is large the geographic area of interest may extend many miles around the venue, while if the expected attendance at the same venue is low, the geographic area of interest may extend only a few city blocks. As another example, the time of day that a traffic accident occurs along a particular section of a roadway may affect the geographic area of interest determined by the proximity unit 206. The number and spacing of ingress and egress points also affects the extent of the geographic area of interest.

At step 512, the information received by the data aggregation unit 210, is used by the traffic flow prediction unit 212 to determine a traffic flow metric for each of the segments in or along the travel routes determined by the mapping unit 204. The flow metric for a segment is based on the effect of the weather, traffic, and event data on the traffic flow along the road segments forming the possible travel routes identified by the mapping unit 204 around the desired start time and desired arrival time that are within the geographic area of interest determined by the proximity unit 206. The traffic flow prediction unit 212 utilizes long range forecast data, short range forecast data or real time data obtained from the data sources 106, 108, 110 depending on the separation of the desired start time and/or the desired arrival time to the current time. In one embodiment, in determining the traffic flow metrics, the traffic flow prediction unit 212 utilizes address information, described above, associated with expected attendees for an event. This address information may be received by the data aggregation unit 210 from the event data source 110. By aggregating the number of expected attendees in a local area using the address information, such as by zip code, city, or neighborhood (or alternately receiving the aggregated address information from the event data source 110), the traffic flow prediction unit 212 can predict the impact on the traffic flow caused by the change in the number of expected travelers for the segments in the geographic area of interest resulting from the occurrence of the event. For example, an event that draws a disproportionate number of travelers from one local area may be predicted to cause increases traffic congestion (e.g., reduced traffic flow), for a small number of segments between that local area and the location of the event in the geographic area of interest, while nearby segments may be relatively unaffected by the occurrence of the event (e.g., traffic on one side of an event venue may be moving very slowly, while traffic on the opposite side of the event venue may be moving without delay).

For road segments outside the geographic area of interest, the traffic flow prediction unit 212 generates a traffic flow metric that does not depend on weather, traffic or event data occurring on or along those segment using techniques well understood in the art (e.g., travel time along segment is the length of the segment divided by the speed limit along the segment).

The traffic flow metrics corresponding to the road segments are provided to the route determination unit 214 which processes the information using one or more algorithms to generate one or more suggested travel routes that satisfy the requirements and preferences of the user at step 514. The route determination unit 214 selects the combination of road segments with the greatest traffic flow which can be physically linked to create an actual travel route from the start location to the destination location. Once the traffic flow metrics are known for each road segment forming the one or more routes, techniques well understood by those skilled in the art are utilized to combine the road segments into the suggested travel route. For example, a combination of road segments between the start location and destination location with minimal travel time based on the sum of the travel times for each segment may be used to form a suggested travel route. In one embodiment, the route determination unit 214 may generate a primary suggested travel route and one or more secondary suggested travel routes, where the secondary suggested travel routes are obtained by varying the combination of the road segments, with the different combination of road segments forming suggested routes that still satisfy the user's requirements and preferences. The primary suggested route need not be the travel route of least time between the starting location and destination. For example, if a user requirement is that the travel route between the start location and destination location has a duration of one hour and the travel route of least time as determined by the intelligent route engine 104 is 45 minutes, the intelligent route engine 104 will determine a primary suggested route between the starting location and destination location using road segments with traffic flow metrics indicating a one hour travel time between the start location and the destination location.

In addition to providing suggested routes, the intelligent route engine 104 can be utilized to provide time of travel information. Since the travel time along any suggested travel route can be determined using the traffic flow metrics, an expected arrival time can be deduced from actual or desired departure time known to the intelligent route engine 104. Similarly, if a desired arrival time is received, the intelligent route engine can deduce the expected departure time required for arrival at the destination location at the desired arrival time. The expected departure times provided to the UE 102 by the intelligent route engine 104 may also include a probability that leaving the start location by the expected departure time will result in arriving at the destination location by the desired arrival time due to uncertainties in the predictive data. For example, in the absence of significant traffic or event data between locations A and B, the desired travel time between the two locations for a sunny day can be predicted with a much greater degree of certainty, than a day where possibility of snow is forecast. Similarly, the expected arrival times provided by the intelligent route engine 104 may include a range of time centered about the desired arrival time, which the user may expect to arrival at the destination location with a high degree of confidence if they depart at the desired departure time provided to the intelligent route engine 104 by the UE 102.

After the suggested routes and expected times have been determined by the route determination unit 214, the channel selector unit 216 selects one or more channels to transmit the route information based on the type of communication system and communication protocol supported and desired by the user through the UE 102 at step 516. These communication systems and protocols are well understood by those skilled in that art and include communication devices such as, without limitation, cell phones, pagers, portable navigation devices, personal computers, personal digital assistants, in-vehicle navigation systems and the like, transmitting the information in a text message, a Short Message Service (SMS), a Multimedia Messaging Service (MMS), a facsimile, a WiFi link (802.11), a WiMax link (802.16), and a wired or wireless Internet link. At step 518 The transmit unit 218 transmits the suggested routes and expected times to the user equipment 102 over the network 109 through one or more communication links selected by the channel selector unit 218.

In one embodiment the intelligent route engine 104 may include a user profile unit 226 in which to store the preferences and requirements of one or more users. The user profile information may be received from the user via the user equipment 102, obtained from a stored personal information profile within the user equipment 102, or deduced from an analysis of prior sessions of providing routing information to the user 310. The stored preferences and requirements in the user profile include, without limitation, weather severity indicators (e.g., acceptable rainfall rate or snowfall amount for through travel), time of day for travel preferences, type of road preferences (e.g., use interstate when possible or no toll road), preferred routes, preferred desired start and arrival times for different locations, and tolerance indicators (e.g., maximum roadway speed limit or how long of a delay can be tolerated before suggesting a different route).

Figure 3:
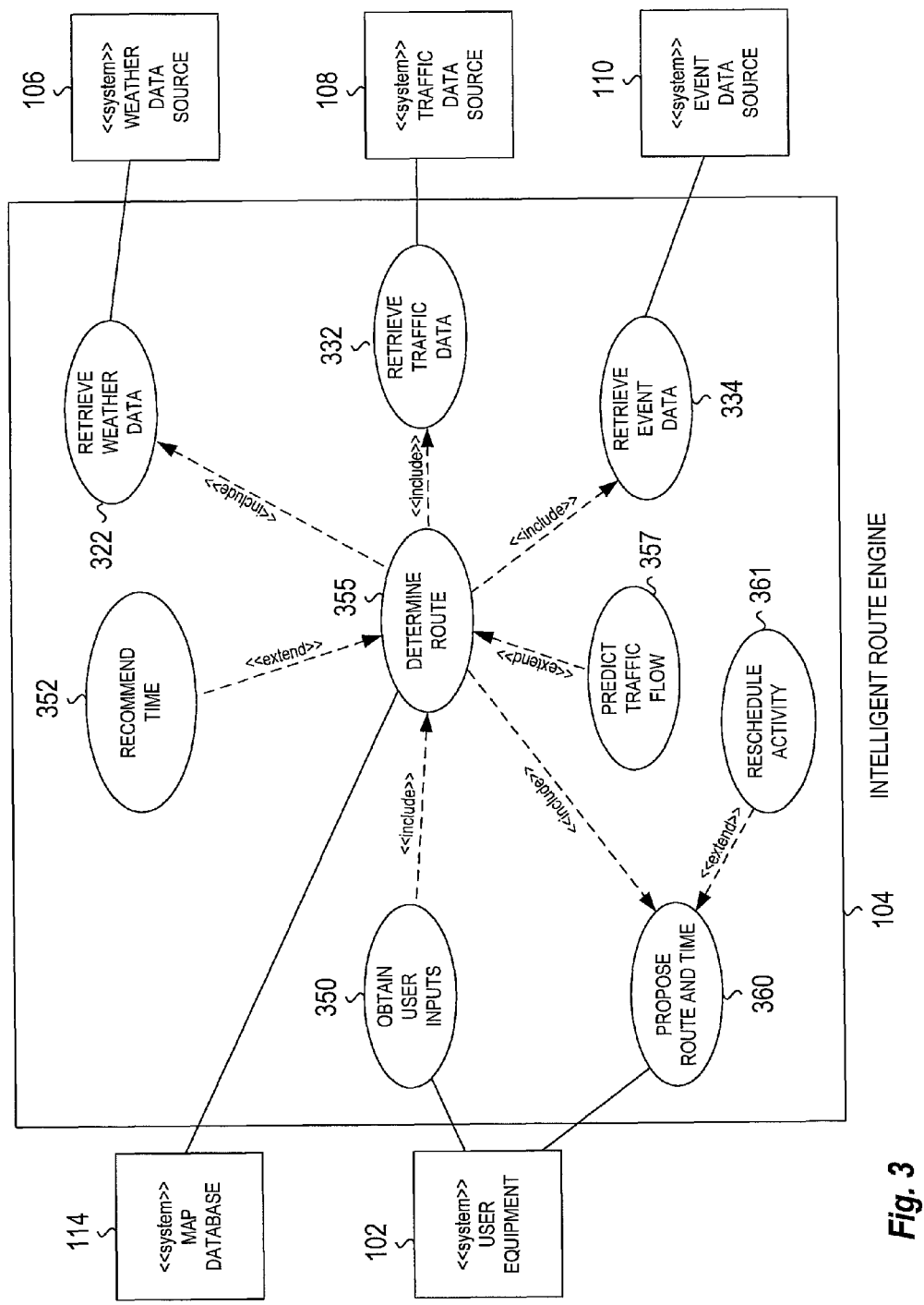
FIG. 3 is a use case diagram for an intelligent route engine according to one embodiment of the travel routing system of FIG. 1.

Referring to FIG. 3, a use case diagram for the intelligent route engine 104 is shown. The UE 102 interacts with the intelligent route engine 104 by providing travel parameters in an obtain user inputs use case 350. The obtain user inputs use case 350 includes the determine route use case 355. The determine route use case 355 is extended by recommend time use case 352 and predict traffic flow use case 357. The determine route use case 355 also includes a retrieve weather data use case 322, a retrieve traffic data use case 332, and a retrieve event data use case 334. A weather source database 106, a traffic source database 108, and an event source database 110 provide input into the intelligent route engine 104 through the retrieve weather data use case 322, the retrieve traffic data use case 332, and the retrieve event data use case 334, respectively. The determine route use case 355 may also utilize map data from the map database 114, as discussed above. The intelligent route engine 104 provides suggested travel routes and expected departure and arrival times to the UE 102 using a propose route and time use case 360. The propose route and time use case 360 is extended by a reschedule activity use case 361.

Figure 4:
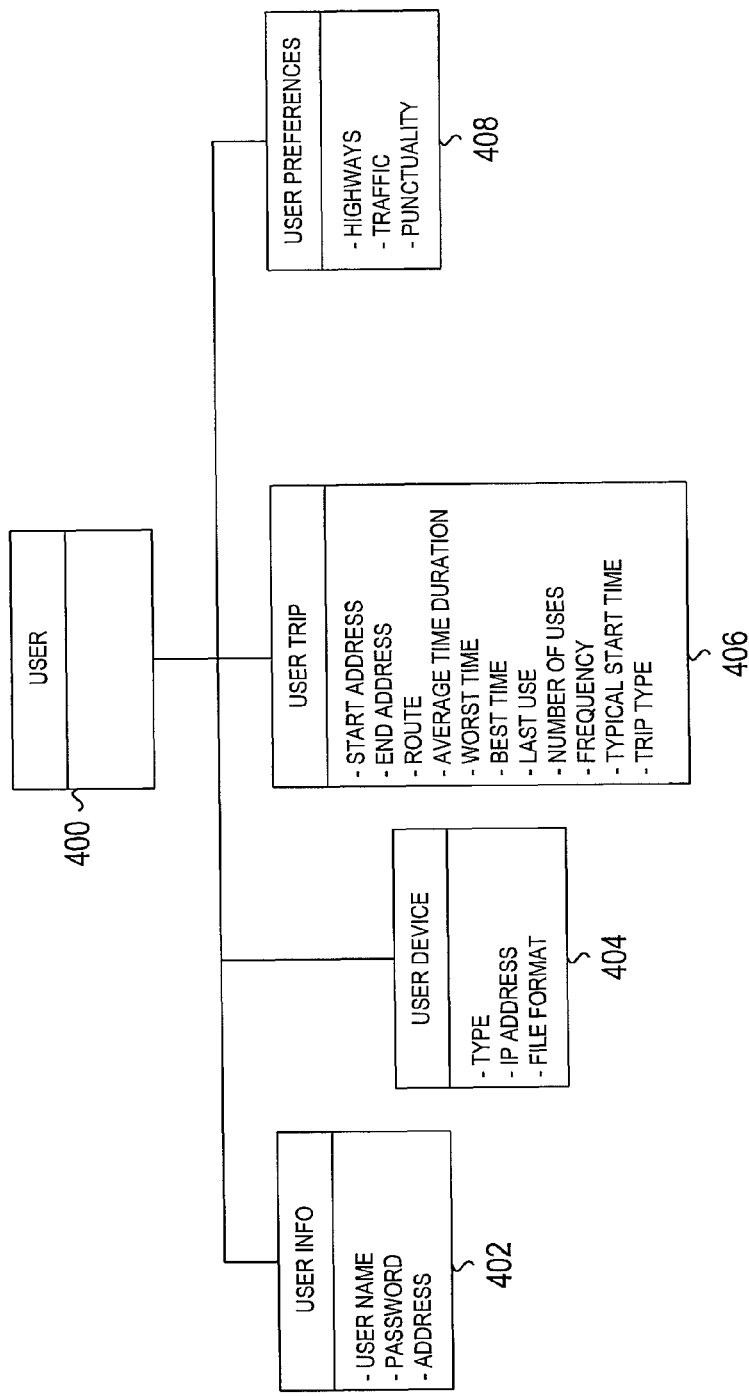
FIG. 4 is a class diagram according to one embodiment.

FIG. 4 is a class diagram which represents the data classes associated with user 310. Referring to FIG. 4, there is a user class 400 which is comprised of a user info class 402 which contains information identifying the user and associated with the user, such as an address. Other information related to the user (e.g., vehicles they own) may also be included in user info class 402 which is not limited to the attributes shown in FIG. 4. A user device class 404 contains attributes describing a device on which the user will receive travel route information. The travel route information may include the primary travel route as well as secondary travel route alternatives, suggested departure times for the travel routes, and other information. For example, the user may receive information on an in-car navigation system, a cell phone, a Personal Digital Assistant (PDA), a computer, or a Personal Video Recorder (PVR). As shown in FIG. 4, the user device class 404 has attributes which describe the device in terms of how to communicate with it (e.g. IP address), the type of device, and a preferred file format. As such, the intelligent route engine 104 can transmit the appropriate information in a readable format to the particular device. User trip class 406 represents trips (routes between a given start location and destination location) and travel parameters describing those trips. User trip class 406 contains data which is useful for understanding the user's particular routes, driving habits, and route statistics. User preferences class 408 contains attributes regarding the user's preferences for highways or secondary roads, tolerance to traffic, and requirements for punctuality. Other user preferences can be contained within user preference class 408, and attributes such as punctuality may have categories such that the user can specify that it is acceptable to be late to certain types of social events (e.g., parties) but not acceptable to be late to meetings or appointments.

Figure 6:
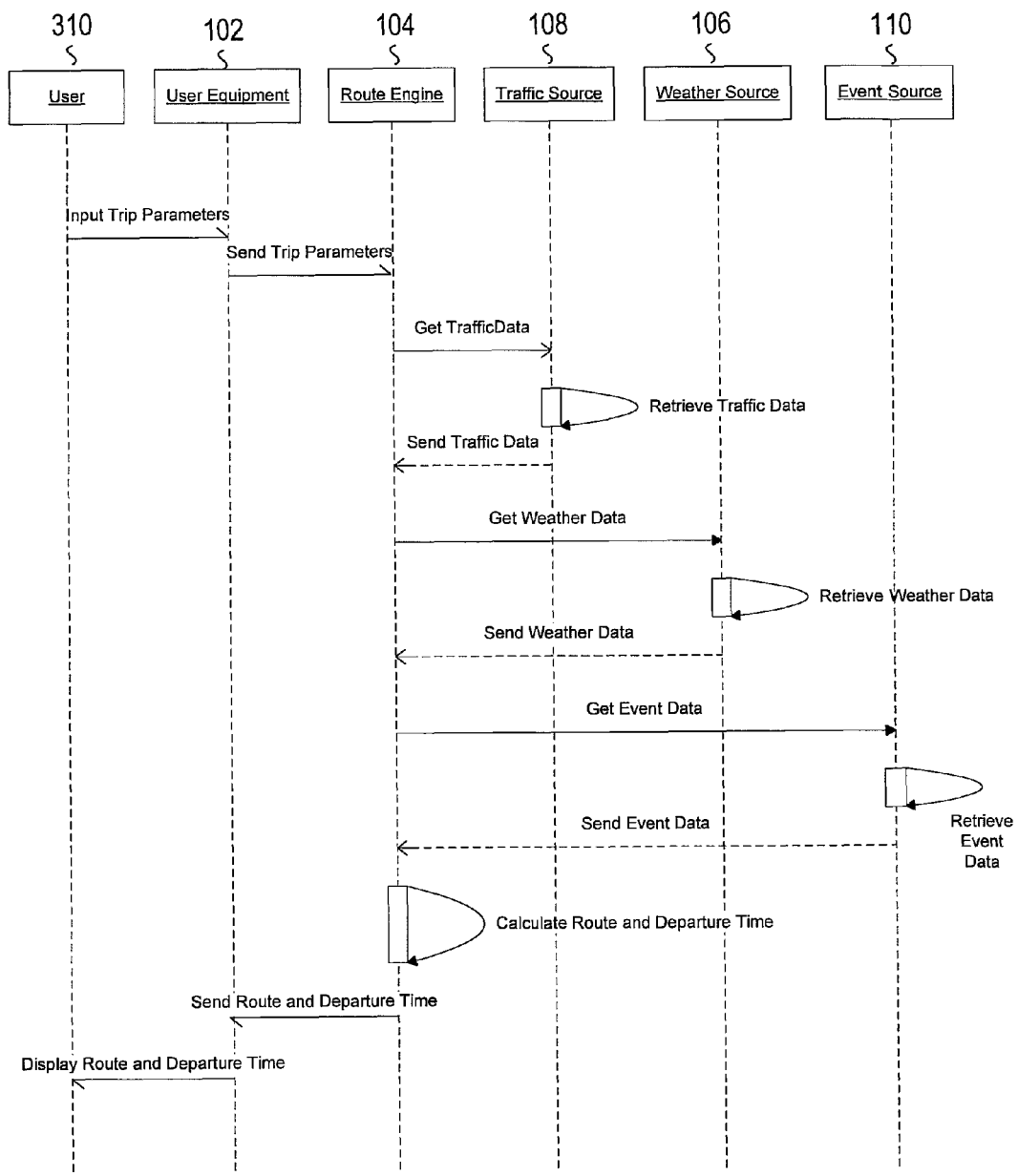
FIG. 6 is a sequence diagram according to one embodiment of the travel route system of FIG. 1.

Referring to FIG. 6, the travel route system 100 may be used to recommend a travel condition dependent departure time to a user for travel between a start location and destination location for arrival at the destination location by an arrival time. A user 310 enters travel parameters at the UE 102. The travel parameters may include the start location, destination location, desired departure time, desired arrival time, duration of travel, and other information related to a specific trip. Data related to the travel parameters is transmitted to the intelligent route engine 104. The intelligent route engine 104 requests data from one or more of the traffic data source 108, the weather data source 106, and the event data source 110 that is pertinent to planning a route corresponding to the travel parameters entered by the user 310. Using the received traffic, weather, and/or event data, the intelligent route engine 104 calculates a suggested route and an expected departure time from the start location to ensure with a predetermined degree of confidence that the user is able to arrive at the destination location by their desired arrival time. The degree of confidence may be a default parameter in the intelligent route system 104, or obtained from the UE 102 based on a value stored in a user profile or input directly by the user. The route and departure time are transmitted to the UE 102, where they are displayed to the user 310. In one embodiment, the intelligent route engine provides a list of expected departure times and the corresponding degree of confidence, allowing the user 310 to choose an expected departure time that fits the urgency of arriving at the destination location at the desired arrival time.

Figure 7:
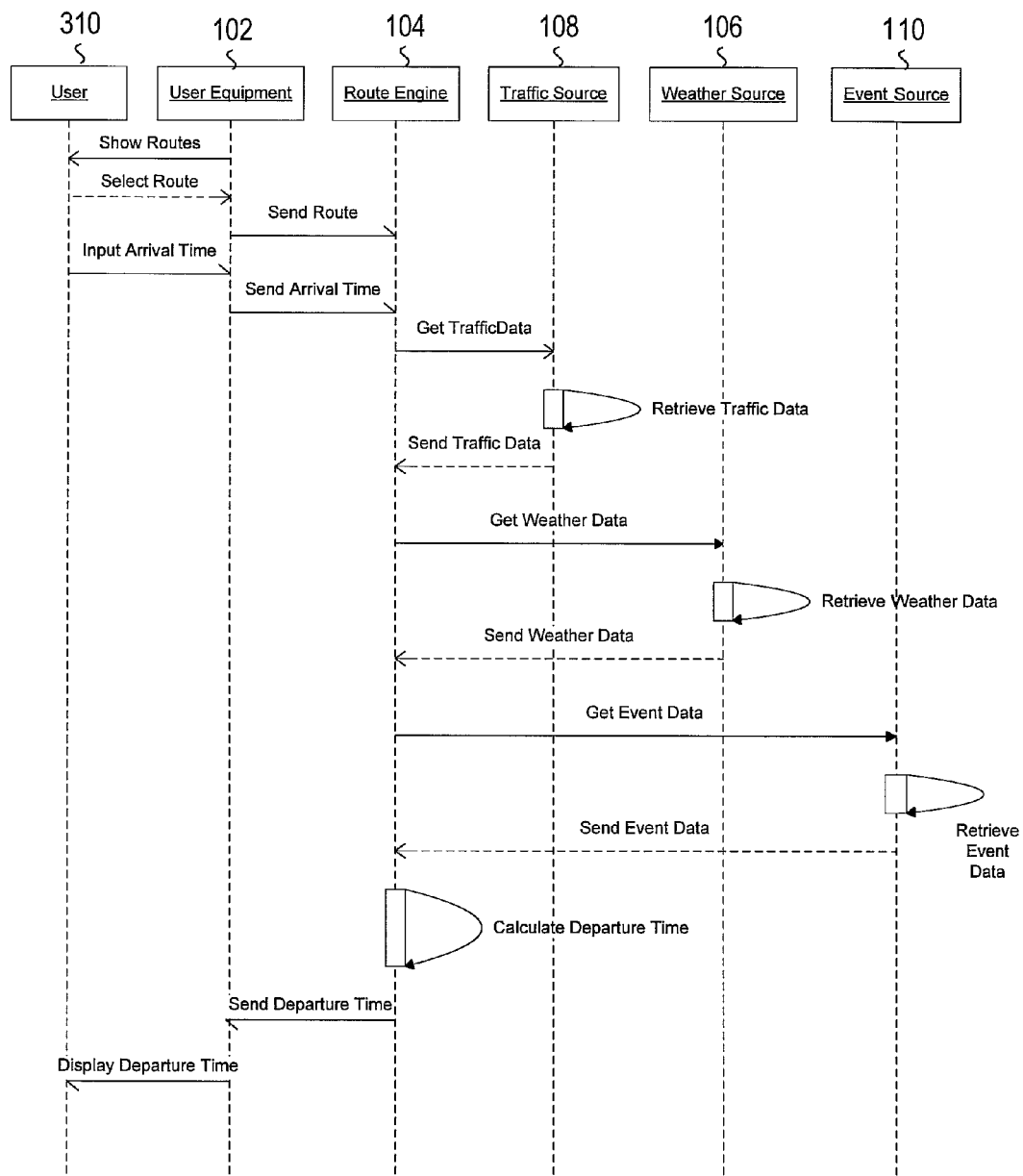
FIG. 7 is a sequence diagram according to one embodiment of the travel route system of FIG. 1.
Figure 8:
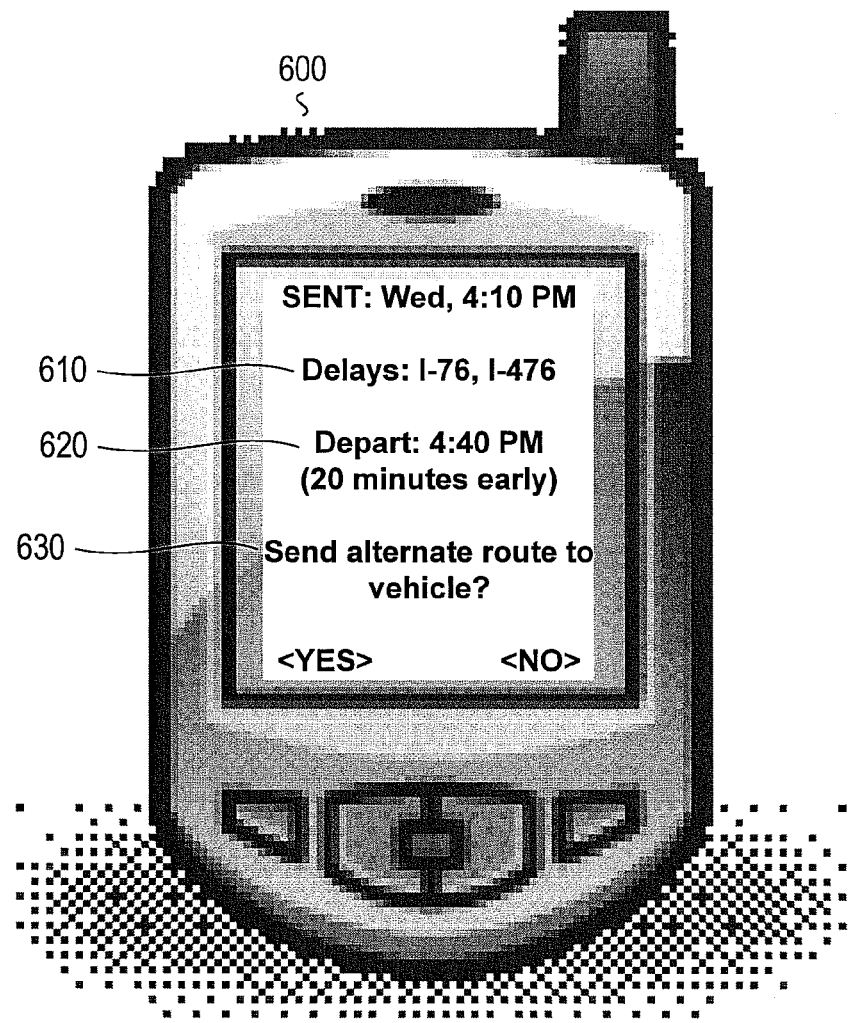
FIG. 8 shows a user notification according to one embodiment of the travel route system of FIG. 1.

Referring to FIG. 7, a departure time is determined by the intelligent route engine 104 for a user 310 based on the user 310 selecting a previously stored route and entering a desired arrival time. In one embodiment, the UE 102 automatically provides a route to the intelligent route engine 104 based on habits of the user, such as a daily commute from work via a preferred route from the place of business to the home. The UE 102 might request an updated departure time and route periodically during the course of the day so that the most recent data affecting the travel route is considered by the intelligent route engine 104. In an alternate embodiment, the intelligent route engine 104 may also provide an update or an alternative to the selected route based on events, hazards, delays, or other unusual condition occurring or expected to occur along the selected route. For example, if the preferred route is to be affected during the evening commute by a motorcade, the intelligent route engine 104 may provide to the UE 102 an alternate route circumventing the projected affected area, including departure time that allows the user to arrive home at a time near the usual desired arrival time. Referring to FIG. 8, an alert including the new departure time 620 and the updated route may be sent to the user's cell phone 600. The alert may also provide one or more sources of the delay 610. The updates may then be transmitted to the user's in-vehicle navigation systems, either by a prompt from the user 630 or automatically. The updated route may also be automatically transmitted to the user's in-vehicle navigation system directly from the intelligent route engine 104 based on a stored preference of the user profile.

In one embodiment, additional user data is used to create the travel route, such as data stored in the user profile or other files or applications associated with the user. For example, data representing a user's scheduled activities with the time and date of these activities may be stored with the user's soft or electronic calendar or the like. The electronic calendar is included as a component in the UE 102. A wide variety of travel parameters and other travel related information may be stored in the user profile as previously described One or more travel routes may be stored in the user profile. These travel routes may have association such as people or times, such that a route can automatically be associated with an activity of the user's calendar. For example, a travel route might have an association of "mom", so that a calendar activity "Visit mom" is automatically associated with that travel route, and the UE 102 can provide that route to the intelligent route engine 104 automatically in determining a travel route for visiting mom at the scheduled day and time. A user may have a travel route they prefer to use on a regularly scheduled basis, such as a route between their home and their place of employment. A user may have a travel route they prefer to use on a semi-regular basis, such as a route from their home to their place of employment and a different route from their place of employment back to their home. A user may prefer to avoid heavily traveled roads during certain types of weather events like snow storms or severe rain storms. This information may be stored in the user profile and accessed by the intelligent route engine 104 upon input from the user. The user may store information related to the type of communication technology the user supports and prefers as well as if the user prefers the travel information distributed over more than one communication channel or to more than one user device. Additionally, the user profile may contain information related to the expected location of a user for certain time periods defaulting to the home address when no other information is available. For example, the user is expected to be at one office address between 8 AM and 5 PM on Monday-Thursday, an alternate address between 9 AM and 4 PM on Friday, and at her home address at all other times.

Figure 9:
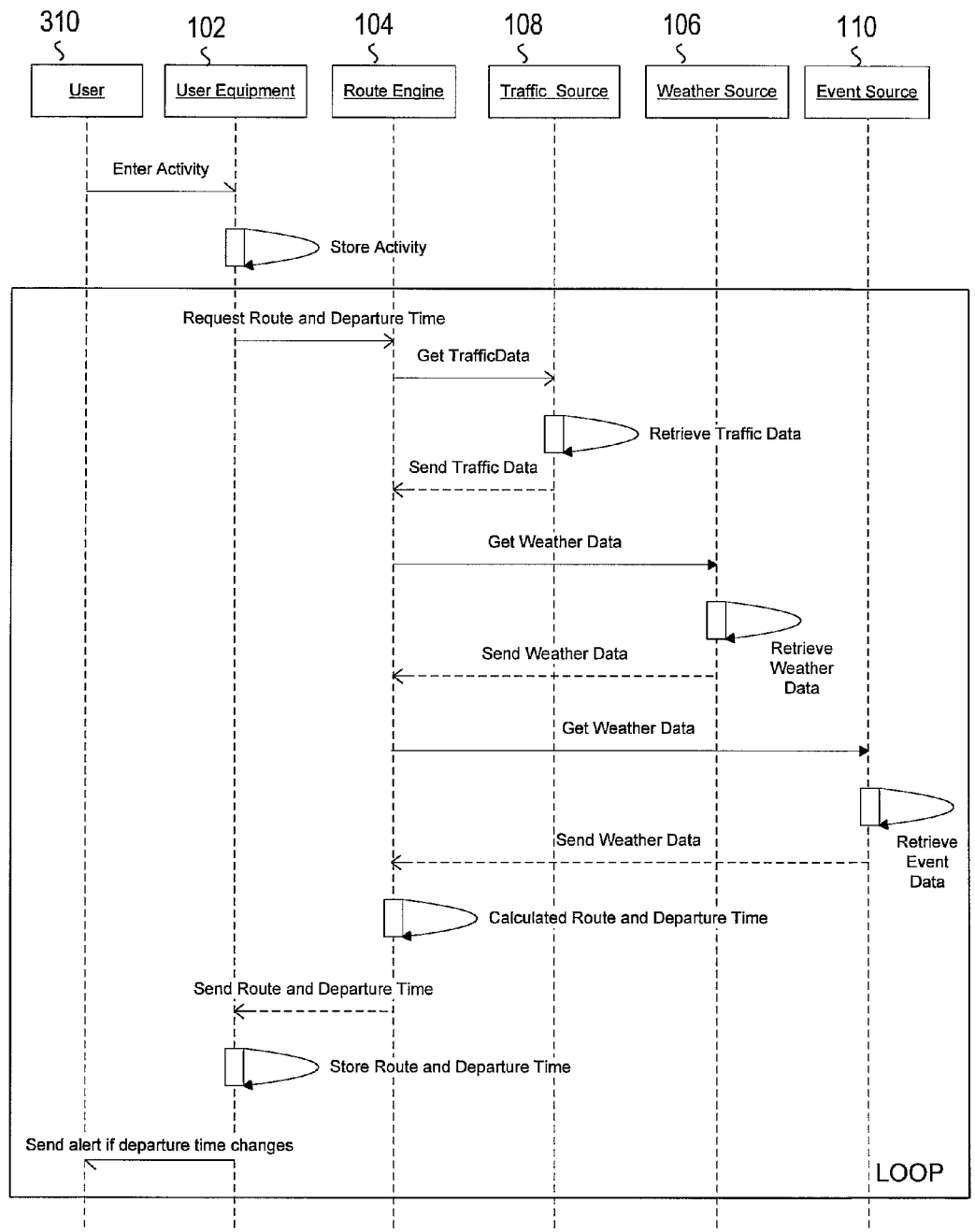
FIG. 9 is a sequence diagram according to one embodiment of the travel route system of FIG. 1.

Referring to FIG. 9, the travel route system 100 may be used to predict a departure time for an activity scheduled far in advance of the occurrence of the activity, such as a flight, appointment, or meeting, and stored in an electronic calendar associated with the UE 102. The user 310 enters an activity into the electronic calendar component of the user equipment 102, and associates travel parameters with the activity, such as a location where the activity is to occur, the start time of (or arrival time at) the activity, and a start location from where the user will depart for the activity. Alternately, the UE 102 may automatically determine one or more of the travel parameters for the activity from information stored with the activity, either by accessing an external source or using preferences stored in the user profile. In addition, from where the user will likely depart for the activity may be determined by the UE 102 based on where the user is expected to be at certain times of the day (e.g., at the office during business hours). For example, a user 310 enters an activity for a business trip along with a flight number in the electronic calendar component of the UE 102. The UE 102 accesses a flight database with a flight number associated with an activity and obtains the departure airport and the departure time of the flight. Based on the time of the flight, the UE 102 may automatically determine that the user 301 should depart for the airport from the user's business location and the suggested time of departure. The user 310 may have a stored preference for a desired time of arrival at the airport before a departure time of a flight. In one embodiment, the activity may also be input into the user's electronic calendar from an external source using software compatible with the electronic calendar component of the UE 102 (e.g., Microsoft Outlook or other applications known to those in the art). An activity may also be entered by synchronizing the UE 102 with another device belonging to the user also containing electronic calendar functionality.

When the activity is entered, the UE 102 requests from the intelligent route engine 104 a suggested route and departure time based on the travel parameters associated with the activity, including the travel parameters that the UE 102 has obtained automatically from external sources. The intelligent route engine 104 calculates a suggested route and departure time based on data received from the traffic, weather, and event data sources. The suggested route and departure time are returned to the UE 102. The suggested route and departure time may be stored in association with the activity, or alternately as a separate activity on the calendar. For example, using the business trip activity from the preceding paragraph, the intelligent route engine 104 receives the travel parameters flight number, departure location (place of business), destination location (airport), desired arrival time at airport, and date/time of travel. The intelligent route engine 104 returns a route from the place of business to the airport and the expected departure time from the place of business, which is then associated with the activity and stored in the UE 102.

Since the activity may be entered days, weeks, even months in advance, the suggested route determined by the intelligent route engine 104 may utilize long range data that includes long term predictive traffic patterns, long term forecast weather patterns, anticipated unscheduled events, and scheduled events. Examples of long range data include long term predictive traffic patterns related to the time of day or season of the year (e.g., typical delay of 40 minutes along 1-95 during the evening rush hour on a Friday in June), a long term prediction of typical weather (e.g., 60% chance of severe thunderstorm activity at 5 PM in Orlando, Fla. in July), and any events that may be scheduled or expected to be scheduled based on historical event data (e.g., an annual festival). If any of the information associated with the activity changes, the UE 102 will request an updated route and departure time. In addition, the UE 102 will periodically request an updated reroute and departure time as the activity approaches, for example, every day in the week before the activity, and then every hour in the 24 hour period before the activity is scheduled to begin. The updated routes are determined using short range data that includes real time traffic data, short term predictive traffic data, current weather conditions, short term weather forecast conditions, scheduled events, and events in progress. If the departure time changes from the previously stored value, an alert is sent to the user.

Figure 10:
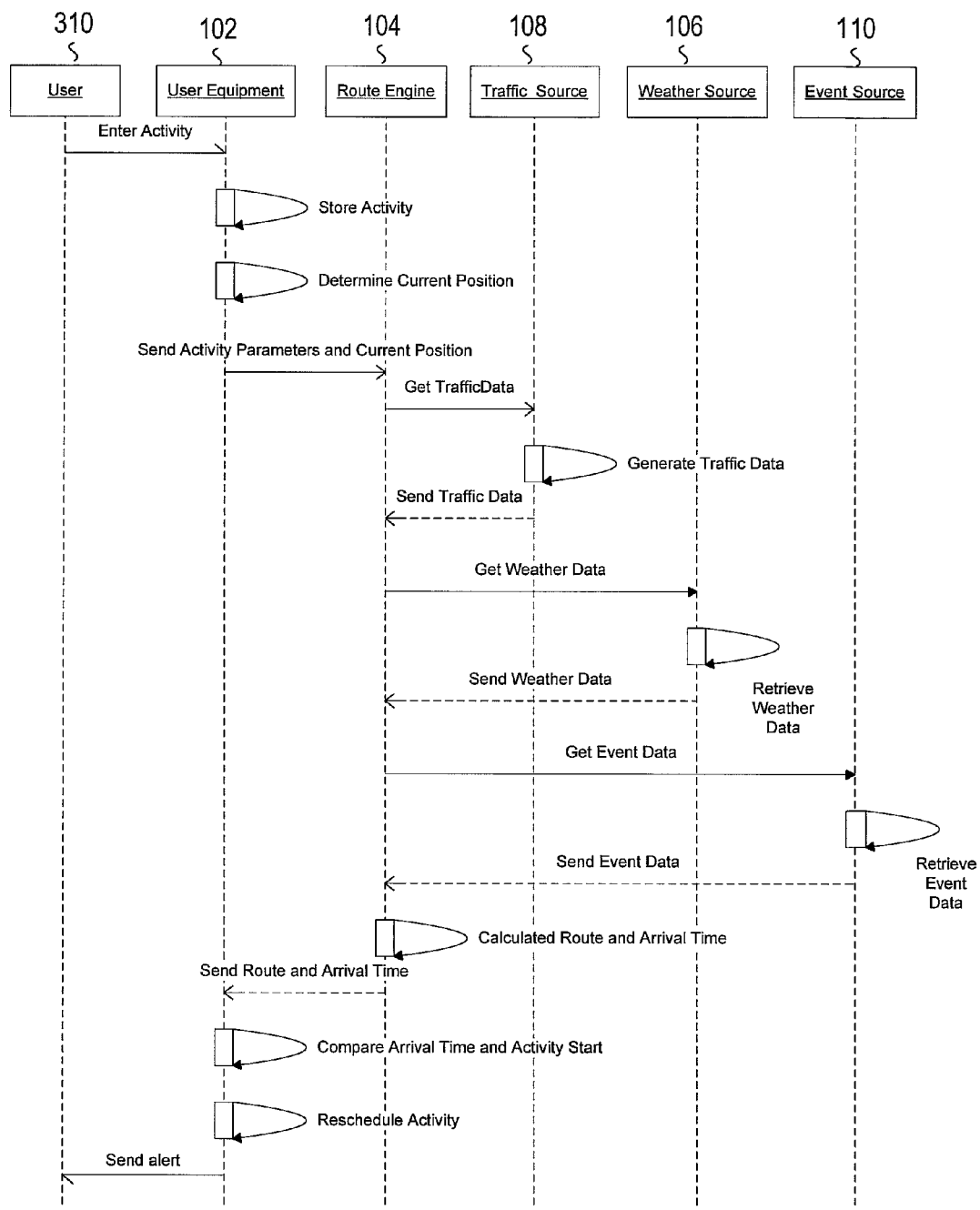
FIG. 10 is a sequence diagram according to one embodiment of the travel route system of FIG. 1.

Referring to FIG. 10, the intelligent route engine may also be used to determine an estimated arrival time for a route associated with an activity included in the calendar module of the UE 102 using the most recent data obtained from the traffic, weather, and event data sources 106, 108, 110. The estimated arrival time may be determined either before the user has departed or after the user has started the trip. If the user has not yet embarked on the trip, the departure time may be determined from an actual departure time associated with the activity, an estimated departure time for the activity, or the current time. The starting location for the trip may be determined from the current location of the user determined using GPS component of the UE 102, cell phone triangulation techniques, or other location methods generally known in the art. After the UE 102 has obtained an estimated arrival time for a route, the estimated arrival time is compared with the scheduled start time for the activity stored in the calendar. The UE 102 may alert the user that he will be late for the activity using visible and audible alerts well understood by those skilled in the art. In one embodiment, the UE 102 will automatically notify other participants in the activity that the user will be late, including the desired arrival time using e-mail, SMS messaging, or other communication protocols well known in the art between the UE 102 and devices associated with the other participants. In one embodiment, the UE 102 and participant devices utilize the same calendar modules (e.g., Microsoft Outlook), and the UE 102 automatically re-schedules an activity for a time after the arrival at the destination location by the user. For example, a user traveling to work expects to arrive in time for an early morning meeting. The UE 102 of the user periodically requests updated route information from the intelligent route engine 104. A major accident along the planned route of the user will delay his arrival until after the planned start of the meeting. After the intelligent route engine 104 has determined an alternate route for the user around the accident and sent that information to the UE 102, the calendar component of the UE automatically accesses the meeting activity, and re-schedules the meeting for a time after the user is expected to arrive at the office and notifies colleagues that the user will be late and that the meeting is rescheduled. The re-schedule notification may also provide a text description of the reason for the re-scheduling based on the major contributor to the unanticipated delay, e.g., accident on I-95, icy surface on Big Hill, etc. In an alternate embodiment, the UE 102 may access an on-line or automated reservation system to change a reservation or appointment corresponding to an activity that may be missed because of unexpected or unavoidable travel delay. For example, if it is determined by the UE 102 from the estimated arrival time obtained from the intelligent route engine 104 that the user will miss a dinner reservation by more than a certain interval, such as 15 minutes, the UE may connect to an on-line reservation system and search for later reservation at the destination restaurant, or even other restaurants in the vicinity.

In one embodiment, if the arrival time at the destination location is later than the start time of the activity, the intelligent route engine 104 may also determine if an alternate travel route exists from the current location of the user to the destination location for a desired arrival time before the activity starting time. If such a route can be constructed by the intelligent route engine 104, that route can be sent to the UE 102 so that the UE 102 can notify the user of the alternate route to arrive at the destination location on or before the activity starting time. If no alternate route can be determined by the intelligent route engine that will allow to the user to arrive at the destination location by the start time of the activity, the UE 102 will reschedule the activity, if possible, as described above.

The travel route system 100 may also be used to deliver targeted advertisements related to the travel routes presented on the UE 102 to the user. The intelligent route engine 104 may be connected to an advertising server, well understood by those skilled in the art, which provides advertisements to the intelligent route engine based on information provided to the advertising server by the intelligent route engine. The advertisements may be targeted to the user based on information obtained in the user profile store in the UE 102 or obtained from other public data sources related to the user. The advertisements may also be targeted to the user based on analysis of the user's habits or a projected need of the user based on time of day, season, or information about vehicle occupants. By way of example, for the same stretch of highway, fast food establishments may be shown for users with children near meal and snack times, while lodging advertisements may be displayed in the evening. If the user is known to be travelling with pets, only pet friendly lodging establishments may be delivered for presentation. Advertisements may also be delivered based on weather conditions or events along the provided travel route. During a snow storm, sources of winter supplies, such as shovels and salt, may be shown instead of coffee and doughnut shops.

Figure 11:
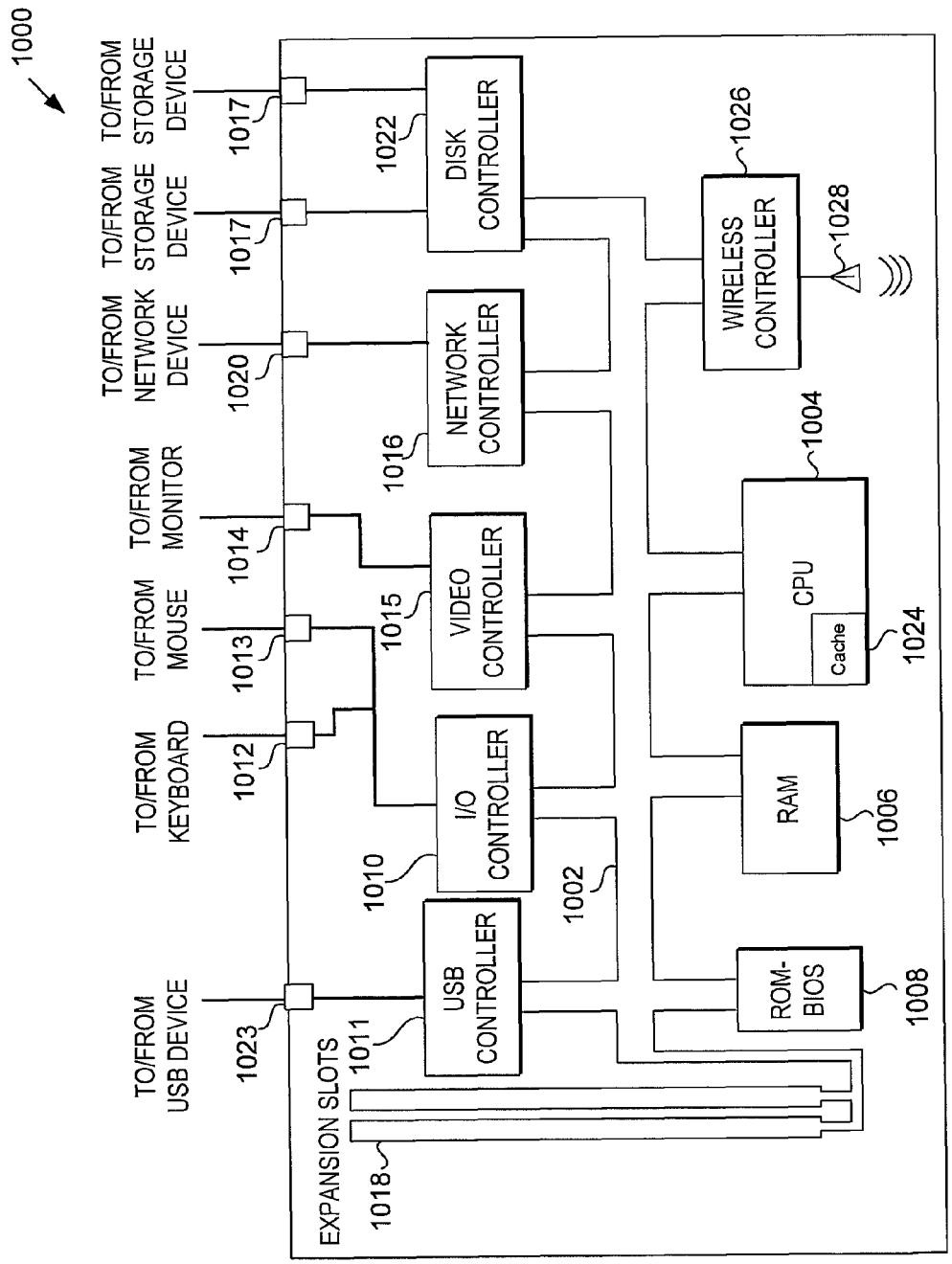
FIG. 11 is a block diagram of a computer system for realization of the travel routing system of FIG. 1.

FIG. 11 is a block diagram of a computer system 1000 through which the embodiments of the present invention may be implemented. A system bus 1002 transports data amongst the Central Processing Unit (CPU) 1004, RAM 1006, the Read Only Memory Basic Input Output System (ROM-BIOS) 1008 and other components. The CPU 1004 can contain a cache memory component 1024. The computer system 1000 may include one or more external storage ports 1017 for accessing a hard disk drive, optical storage drive (e.g., CD-ROM, DVD), flash memory, tape device or other storage device (not shown). The relevant storage device(s) are connected through the external storage port 1017 which is connected to the system bus 1002 via a disk controller 1022. A keyboard and mouse (not shown) can be connected to the keyboard port 1012 and mouse port 1013, respectively, which are connected to the system bus 1002 through the I/O controller 1010. A monitor (not shown) can be connected to a monitor port 1014 which is connected to the system bus 1002 through the video controller 1015. A network device (not shown), including but not limited to an Ethernet device or other device having networking capability, can be connected to a network port 1020 which is connected through the network controller 1016 to the system bus 1002. The computer system 1000 may be wirelessly connected to a network device that is configured for wireless operation (not shown), including but not limited to wireless routers, using an antenna 1028 connected to a wireless controller 1026 connected to the system bus 1002, where the antenna transmits/receives signals to/from the network device. Additional ports, such as parallel or serial ports (not shown), may be utilized through the I/O controller 1010. The computer system 1000 may include one or more USB ports 1023. A USB device (not shown), including but not limited to a printer, scanner, keyboard, mouse, digital camera, storage device, PDA and webcam, can be connected to the USB port 1023 which is connected to the system bus 1002 through the USB controller 1011. Expansion slots 1018 can be comprised of Industry Standard Architecture (ISA) slots, Peripheral Component Interconnect (PCI) expansion slots, PCI Express expansion slots, Accelerated Graphics Port (AGP) slots or any other slot generally known in the art to allow additional cards to be placed into the computer system 1000. These slots can be used to connect network cards, video cards, sound cards, modems and any other peripheral devices generally used with a computer. The computer system 1000 also includes a source of power (not shown), including but not limited to a power supply connected to an external source of power, and an internal battery. Detailed descriptions of these devices have been omitted for convenience only and should not be construed as limiting.

The techniques described herein may be implemented in hardware, software, or a combination thereof. For a hardware implementation, the processing units within a base station or a mobile station may be implemented within one or more application specific integrated circuits (ASICs), digital signal processors (DSPs), digital signal processing devices (DSPDs), programmable logic devices (PLDs), field programmable gate arrays (FPGAs), processors, processors, micro-processors, microprocessors, other electronic units designed to perform the functions described herein, or a combination thereof.

For a software implementation, the techniques described herein may be implemented with modules (e.g., procedures, functions, etc.) that perform the functions described herein. The software codes may be stored in memory units and executed by processors. The memory unit may be implemented within a processor or external to the processor, in which case it can be communicatively coupled to the processor via various means as is generally known in the art.

Those skilled in the art will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described herein generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The embodiments of the present invention may be implemented with any combination of hardware and software. If implemented as a computer-implemented apparatus, the present invention is implemented using means for performing all of the steps and functions described above.

The embodiments of the present invention can be included in an article of manufacture (e.g., one or more computer program products) having, for instance, computer useable media. The media has embodied therein, for instance, computer readable program code means for providing and facilitating the mechanisms of the present invention. The article of manufacture can be included as part of a computer system or sold separately.

While specific embodiments have been described in detail in the foregoing detailed description and illustrated in the accompanying drawings, it will be appreciated by those skilled in the art that various modifications and alternatives to those details could be developed in light of the overall teachings of the disclosure and the broad inventive concepts thereof. It is understood, therefore, that the scope of the present invention is not limited to the particular examples and implementations disclosed herein, but is intended to cover modifications within the spirit and scope thereof as defined by the appended claims and any and all equivalents thereof.

What is claimed:

1. A method of recommending a travel route, the method comprising:
   (a) receiving an indication of a start location and a destination location, and a desired arrival time at the destination location;
   (b) identifying one or more road segments included in possible routes between the start location and the destination location;
   (c) receiving traffic data, event data, and weather data from at least one traffic data source, at least one event data source, and at least one weather data source, respectively, for the one or more road segments corresponding to a desired time of travel between the start location and the destination location, wherein the event data includes address information corresponding to expected attendees for one or more events occurring in a geographic area proximate to the one or more road segments; and
   (d) creating at least one suggested travel route from the start location to the destination location for arriving at the destination by the desired arrival time using the one or more road segments based on analyzing the impact of the traffic data, the event data, and the weather data on the one or more road segments during the desired time of travel between the start location and the destination location, wherein the analyzing the impact includes, at least in part, using the address information to determine a change in a number of expected travelers for the one or more road segments in the geographic area resulting from the occurrence of the one or more events.

2. The method of claim 1, wherein the indication of the start location and the destination location and the desired arrival time at the destination location are received by an intelligent route engine from a user device via a communication network.

3. The method of claim 1, wherein the desired time of travel between the start location and the destination location is determined based on the desired arrival time.

4. The method of claim 1, wherein creating the at least one suggested travel route further comprises:
  (i) determining a traffic flow for the one or more road segments based on the traffic data, the event data, and the weather data;
  (ii) determining at least one combination of the one or more road segments that can be linked together to create the at least one travel route;
  (iii) comparing the traffic flow for the at least one combination of the one or more road segments; and
  (iv) selecting the at least one combination with the greatest traffic flow.

5. The method of claim 1, wherein the traffic data includes traffic pattern data, the traffic pattern data related to historical traffic patterns along the one or more road segments.

6. The method of claim 1, further comprising:
  (e) providing the at least one suggested travel route to a user device for display of the travel route.

7. The method of claim 5, wherein the start location corresponding to the current location of the user is automatically determined by a GPS component included in the user device.

8. The method of claim 5, wherein the at least one suggested travel route is provided by an intelligent route engine to the user device using at least one of a wireless text message, a short message service (SMS), a facsimile, a WiFi link, a WiMax link, and a wired or wireless internet link.

9. The method of claim 1, wherein the traffic data received in step (c) includes at least one of predictive traffic data, historical traffic data, and real-time traffic data.

10. The method of claim 1, wherein the weather data received in step (c) includes at least one of current weather conditions, historical weather conditions, and predicted future weather conditions.

11. The method of claim 10, wherein a weather condition includes an indication of an occurrence of a weather phenomenon.

12. The method of claim 1, wherein the event data received in step (c) includes at least one of historical events, scheduled events, anticipated future events, and events in progress.

13. The method of claim 1, further comprising:
  (g) generating updates for the at least one suggested travel route in response to obtaining updated traffic, event, and weather data during the travel from the start location to the destination location; and
  (h) providing the updates to a user device for display.

14. A method of recommending a travel route, the method comprising:
  (a) receiving an indication of an start location and a destination location;
  (b) receiving a desired arrival time associated with the destination location;
  (c) identifying at least one possible travel route from the start location to the destination location;
  (d) receiving data comprising at least one of traffic data, weather data, and event data from at least one traffic data source, at least one weather data source, and at least one event data source, respectively, corresponding to the at least one possible travel route, wherein the event data includes address information corresponding to expected attendees for one or more events occurring in a geographic area proximate to the at least one travel route;
  (e) predicting the effect of the data on a traffic flow along the at least possible one possible travel route at least in part by using the address information to determine a change in a number of expected travelers for segments of the at least one possible travel route in the geographic area resulting from the occurrence of the one or more events; and
  (f) selecting one of the at least one possible travel routes based on the predicted effect of the data on the traffic flow and the target arrival time.

15. The method of claim 14, wherein the selecting of step (f) includes:
  (i) determining a traffic flow for each route of the at least one possible travel route based on the predicted effect from step (e);
  (ii) comparing the traffic flow for each route to identify the at least one possible travel route with the greatest traffic flow for a time associated with the desired arrival time; and
  (iii) selecting the at least one possible travel route with the greatest traffic flow.

16. The method of claim 14, wherein the indication of the start location, the destination location, and the desired arrival time at the destination location are received by an intelligent route engine from a user device via a communication network.

17. The method of claim 14, wherein the traffic data received in step (d) includes at least one of predictive traffic data, historical traffic data, and real-time traffic data.

18. The method of claim 14, wherein the weather data received in step (d) includes at least one of current weather conditions, historical weather conditions, and predicted future weather conditions.

19. The method of claim 14, wherein the event data received in step (d) includes at least one of historical events, scheduled events, anticipated future events, and events in progress.

20. The method of claim 19, wherein the event data for an event includes a scheduled begin time, projected end time, an event venue, and an expected attendance.

21. A method of recommending a travel route, the method comprising:
  (a) receiving an indication of an start location and a destination location;
  (b) receiving a desired departure time associated with the start location and a desired arrival time associated with the destination location;
  (c) identifying one or more road segments;
  (d) receiving traffic data from at least one traffic data source corresponding to the one or more road segments;
  (e) receiving event data from at least one event data source corresponding to one or more events proximate to the one or more road segments, the event data including address information corresponding to expected attendees for the one or more events occurring in a geographic area proximate to the one or more road segments;
  (f) receiving weather data from at least one weather data source corresponding to at least one weather phenomenon proximate to the one or more road segments;
  (g) predicting a traffic flow along each of the one or more road segments for a time interval corresponding to the desired departure time and the desired arrival time by using the traffic data, the event data, and the weather data, and by using the address information to determine a change in a number of expected travelers for the one or more road segments in the geographic area resulting from the occurrence of the event; and (h) creating at least one suggested travel route from the start location to the destination location by linking a set of the one or more road segments based on the predicted traffic flow along each segment.

22. The method of claim 21, wherein at least one combination of the one or more road segments that can be linked together to create the at least one travel route is determined.

23. The method of claim 21, wherein creating the at least one suggested travel route in step (g) includes comparing the predicted traffic flow for at least one combination of the one or more road segments joining the start location and the destination location based on the impact of the traffic data, the event data, and the weather data on the traffic flow, and selecting the combination of the one or more road segments with the greatest traffic flow.

24. An article of manufacture for recommending a travel route, the article of manufacture comprising a computer-readable medium holding computer-executable instructions for performing a method comprising:
   (a) receiving an indication of a start location and a destination location, and a desired arrival time at the destination location;
   (b) identifying one or more road segments included in possible routes between the start location and the destination location;
   (c) receiving traffic data, event data, and weather data from at least one traffic data source, at least one event data source, and at least one weather data source, respectively, for the one or more road segments corresponding to a desired time of travel between the start location and the destination location, wherein the event data includes address information corresponding to expected attendees for one or more events occurring in a geographic area proximate to the one or more road segments; and
   (d) creating at least one suggested travel route from the start location to the destination location for arriving at the destination location by the desired arrival time using the one or more road segments based on analyzing the impact of the traffic data, the event data, and the weather data on the one or more road segments during the desired time of travel between the start location and the destination location, wherein the analyzing the impact includes, at least in part, using the address information to determine a change in a number of expected travelers for the one or more road segments in the geographic area resulting from the occurrence of the one or more events.

25. A system for recommending a travel route, the system comprising:
   a receiver unit configured to receive an indication of a start location and a destination location, and a desired arrival time at the destination location;
   a mapping unit configured to identify one or more road segments included in possible routes between the start location and the destination location;
   a data aggregation unit configured receive traffic data, event data, and weather data from at least one traffic data source, at least one event data source, and at least one weather data source, respectively, for the one or more road segments corresponding to a desired time of travel between the start location and the destination location, wherein the event data includes address information corresponding to expected attendees for one or more events occurring in a geographic area proximate to the one or more road segments; and
   a route determination unit configured to create at least one suggested travel route from the start location to the destination location for arriving at the destination location by the desired arrival time using the one or more road segments based on analyzing the impact of the traffic data, the event data, and the weather data on the one or more road segments during the desired time of travel between the start location and the destination location, wherein the analyzing the impact includes, at least in part, using the address information to determine a change in a number of expected travelers for the one or more road segments in the geographic area resulting from the occurrence of the one or more events.

* * * * *